United States Patent [19]

Wiesner et al.

[11] 4,156,105

[45] May 22, 1979

[54] CIRCUIT ARRANGEMENT FOR SYNCHRONIZING A TYPE CARRIER IN A PRINTER

[75] Inventors: Wolfgang Wiesner, Munich; Dietrich Arene, Unterpfaffenhofen, both of Fed. Rep. of Germany

[73] Assignee: Siemens Aktiengesellschaft, Berlin & Munich, Fed. Rep. of Germany

[21] Appl. No.: 897,397

[22] Filed: Apr. 18, 1978

[30] Foreign Application Priority Data

May 11, 1977 [DE] Fed. Rep. of Germany ....... 2721271

[51] Int. Cl.² ..................... H04L 15/34; G06K 15/06; B41J 1/50
[52] U.S. Cl. ................................. 178/34; 101/93.19
[58] Field of Search .................... 178/23 R, 28, 32, 34, 178/35, 38, 53, 53.1 R, 69.1; 101/93.18, 93.19; 318/467, 685

[56] References Cited

U.S. PATENT DOCUMENTS

| 3,399,753 | 9/1968 | Revelle | 178/34 |
| 3,816,656 | 6/1974 | Ludwig | 178/34 |
| 3,823,265 | 7/1974 | Ludwig et al. | 178/34 |
| 4,005,264 | 1/1977 | Humbs et al. | 178/34 |

*Primary Examiner*—Thomas A. Robinson
*Attorney, Agent, or Firm*—Hill, Gross, Simpson, Van Santen, Steadman, Chiara & Simpson

[57] ABSTRACT

A circuit arrangement is disclosed which compares a preferred position of a type carrier driven by a stepping motor with binary values of signals actuating the stepping motor. If a signal assigned to the preferred position and a signal produced by the binary values of the signals do not coincide, stepping pulse trains are fed to the stepping motor until coincidence is reached. The stepping motor is thereby accelerated in accordance with an acceleration program so that said stepping motor runs with an approximately constant load angle as soon as possible, and that an unequivocal assignment exists between the stepping pulses and the position of the type carrier.

8 Claims, 3 Drawing Figures

CIRCUIT ARRANGEMENT FOR SYNCHRONIZING A TYPE CARRIER IN A PRINTER

BACKGROUND OF THE INVENTION

The invention relates to a circuit arrangement for synchronizing a type carrier with the count of a binary counter provided in a control unit in printers wherein the type carrier is set by a stepping motor advanced by means of stepping pulses. A sampling device is provided which produces a synchronizing signal whenever the type carrier assumes a predetermined position.

U.S. Pat. No. 4,005,264 discloses an arrangement for scanning a disc-shaped type carrier in printers, wherein the type carrier is set with the aid of a stepping motor. The arrangement contains a stepping motor control unit which is provided with a ring counter at the outputs of which drive pulses for the stepping motor are emitted. The ring counter is advanced by stepping pulse trains. The arrangement contains a comparator device which compares the binary values of the output pulses with binary values assigned to a specific character. In the event of identity, the comparator device emits an output pulse. The type carrier is provided with a scan sector which extends over a plurality of characters and comprises the specific character, for example the letter "E". Scan sectors are discussed in more detail in U.S. Pat. No. 4,005,264 incorporated herein by reference. When a scanning pulse occurs produced by means of a scanning element due to the scanning of the scan sector, and at the same time the comparator device produces the output pulse, the arrangement emits a synchronizing signal. This synchronizing signal is used to synchronize the position of the type carrier with a binary counter indicating the position of the type carrier.

U.S. Pat. No. 3,823,265, incorporated herein by reference, discloses a code-controlled printer, wherein the instantaneous position of the type carrier is caused to conform with the count of a binary counter arranged in a control unit of the printer in that a pulse train disc connected to the type carrier is provided with a synchronizing mark which is assigned to a frequently occurring, predetermined character, for example the letter "E". Independently of other settings, the binary counter is set to the code character assigned to this predetermined character, by means of a synchronizing signal, as soon as the synchronizing mark is recognized by an associated scanning element. Thus in this known printer, synchronization is carried out by the type carrier. In various situations, however, it is expedient not to synchronize the binary counter by the type carrier, but to synchronize the type carrier by the binary counter.

SUMMARY OF THE INVENTION

An object of the invention is to provide a circuit arrangement for synchronizing a type carrier in printers, wherein the synchronizing position of the type carrier is automatically set whenever the control unit arranged in the printing unit establishes that the type carrier should have assumed its synchronizing position.

In accordance with the present invention, the object is realized in the circuit arrangement of the type described in the introduction by means of a switching stage which contains a pulse generator which, following the occurrence of a triggering signal produced by the control unit, and a simultaneous absence of the synchronizing signal, produces stepping pulse trains with the aid of timing pulses produced in an oscillator, and emits said stepping pulse trains to a stepping motor control unit connected to the stepping motor until the synchronizing signal occurs.

The circuit arrangement in accordance with the present invention has the advantage that no pulse train disc for the production of timing pulses for advancing the binary counter is required on the type carrier, as it is the binary counter which determines the position of the type carrier and not the type carrier which determines the position of the binary counter. The circuit arrangement automatically conducts a hunting sequence into the synchronizing position whenever the binary counter contains the binary combination assigned to the synchronizing position and the synchronizing signal is not present.

An advantageous embodiment of the circuit arrangement is characterized in that the circuit arrangement contains a flip-flop which is set by the triggering signal when the synchronizing signal is not present, which is reset following the occurrence of the synchronizing signal, and which emits at its output a control signal which serves to release the pulse generator whenever it is set.

In order to operate the stepping motor in such manner that it operates as soon as possible with a virtually constant load angle, and thus a clearly defined coordination exists between the stepping pulse train and the position of the type carrier, it is advantageous for the pulse generator to contain a store which stores binary values which are assigned to a start program for the stepping motor and which are read out under the control of the timing pulses. The pulse generator also contains an AND gate which logic-links the read-out binary values with the timing pulses and emits the stepping pulse trains at its output. In particular it is favorable to provide a shift register as a store.

In order to prevent the analysis of the synchronizing signal during the start phase of the stepping motor, it is expedient to provide a delay element which produces a release signal which does not facilitate the analysis of the synchronizing signal until a predetermined number of stepping pulses have been emitted to the stepping motor control unit.

In order to terminate the synchronizing process when the synchronizing position has been reached, it is advantageous to provide a logic-linking element which is fed with the release signal and the synchronizing signal and which produces a resetting signal which terminates the synchronizing process.

In order to prevent the retriggering of a synchronizing process due to oscillation of the type carrier at the end of the synchronizing process and an associated short interruption in the synchronizing signal, it is advantageous to provide a time element which is fed with the resetting signal and which produces a signal which prevents the setting of the flip-flop during a predetermined length of time following the occurrence of the resetting signal.

DESCRIPTION OF THE PREFERRED EMBODIMENTS

Figure 1:
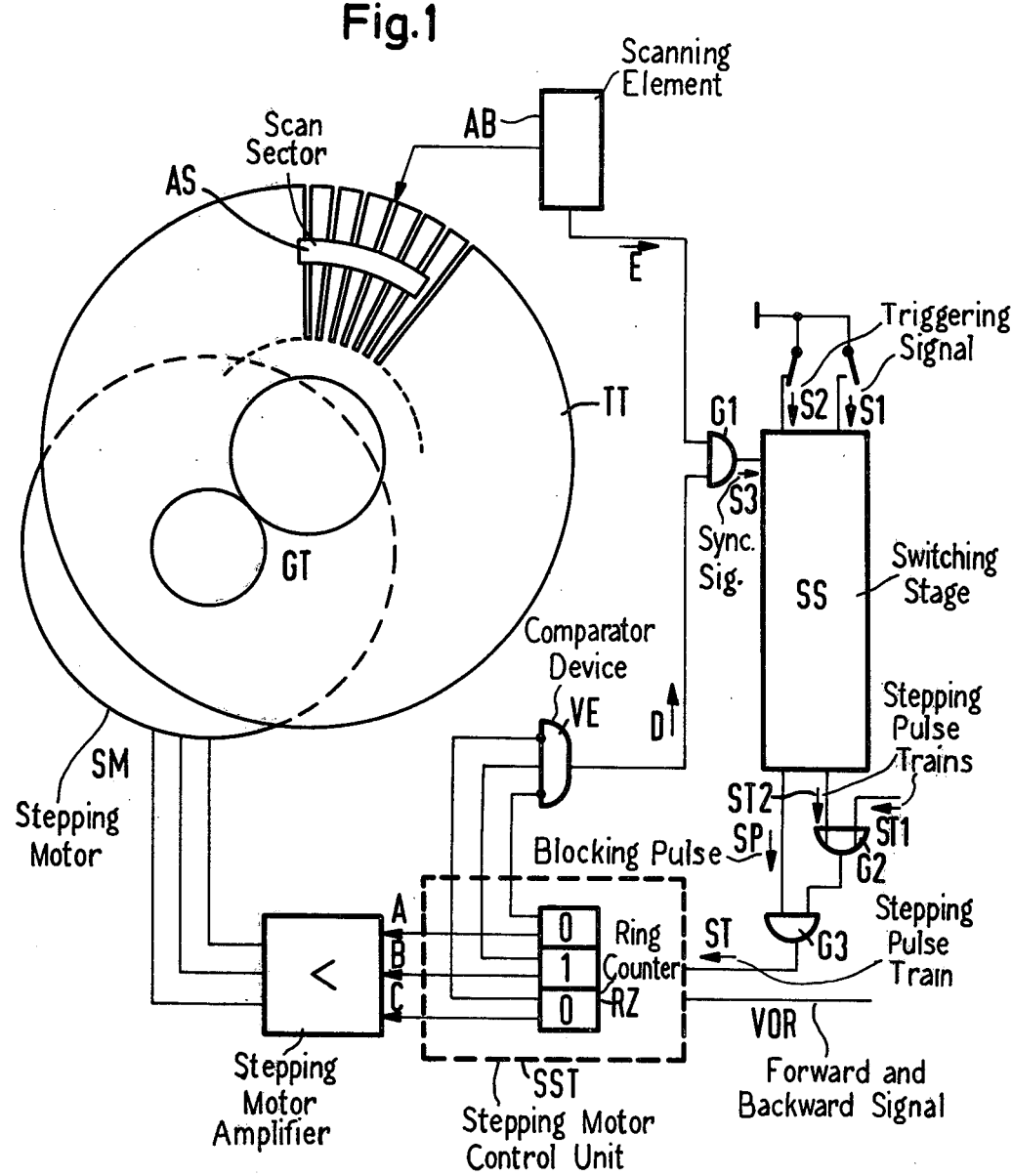
FIG. 1 is a block circuit diagram of the circuit arrangement.

The disc-shaped type carrier TT illustrated in FIG. 1 is set via a transmission GT by a stepping motor SM having three windings. The stepping motor SM is controlled with the aid of the stepping motor control unit SST of which only a ring counter has been represented. A stepping pulse train ST and a signal VOR which determines the forward movement and backward movement of the stepping motor SM are fed to the input of the stepping motor control unit. A complete diagram of the control unit SST is shown in FIG. 4 of U.S. Pat. No. 3,816,656. This signal VOR can be produced, for example, in the manner also described in U.S. Pat. No. 3,816,656, incorporated herein by reference. The ring counter RZ is stepped onward in accordance with the stepping pulse train ST. The count of the ring counter represents the stepping position of the stepping motor SM in the form of a three-digit binary combination A, B, C.

With each stepping pulse train ST, the stepping motor SM is rotated by an angle position of 30° which, taking into consideration the transmission GT, represents a rotation of the type carrier TT by one graduation. Each of these stepping positions corresponds to a specific binary combination A, B, C. The control of a stepping motor SM in accordance with these principles is known per se and does not constitute the subject of the invention. Here it will be assumed that the binary combination 010 is assigned to a position of the stepping motor SM which corresponds to the print-out position of the character "E" on the type carrier TT.

The circuit arrangement contains a comparator device VE which checks the count of the ring counter RZ in the stepping motor control unit SST for the binary combination 010. Such a comparator device VE is well known in the art and is illustrated in U.S. Pat. No. 4,005,264. On the type carrier TT is arranged a scan sector AS which extends over a plurality of type arms bearing the types or characters. The scanning element AB is provided for scanning the scan sector AS. The output of the scanning element AB and the output of the comparator device VE are connected to an AND gate G1, at the output of which a synchronizing signal S3 is fed to a switching stage SS.

As the character "E" occurs most frequently in a German text, the synchronizing position is assigned to this character for devices utilizing German text. When the binary combination 010 is present at the input of the comparator device VE, the comparator device emits a signal D to the AND gate G1. The scan sector AS extends over a series of type arms of the type character, the type arm bearing the character "E" being situated in the center. When the scan sector AS is recognized by the scanning element AB, the latter emits the signal F to the AND gate G1. Thus the synchronizing signal S3, which indicates that the synchronizing position has been recognized, is emitted from the output of the AND gate G1.

The stepping pulse trains ST are emitted via an AND gate G3 from the output of an OR gate G2. An input of the OR gate G2 is fed with stepping pulse trains ST1 which, for the normal operation of the printer, are produced in a printer control unit PC of typical known teleprinters which includes a binary counter BC. The second input is fed with stepping pulse trains ST2 which are produced in the switching stage SS in order to set the type carrier TT at the synchronizing position whenever necessary. The switching stage SS is fed with a triggering signal S1 which is produced for example with the aid of a switch and on the occurrence of which a synchronizing process is triggered when the synchronizing signal S3 is not present. The triggering signal S1 is produced, for example, whenever the printer is switched on or whenever the synchronizing position is recognized in the binary counter assigned to the position of the type carrier TT in the control unit of the printer and the synchronizing signal SC is not present. The switching stage SS is also fed with a signal S2 which is likewise produced, for example, with the aid of a switch and is produced whenever the synchronizing position is recognized as the next position of the type carrier TT in the control unit of the printer. If, in this case, the type carrier TT already occupies the synchronizing position, the switching stage SS produces a blocking signal SP which blocks the stepping pulse trains ST with the aid of the AND gate G3 in order to prevent the movement of the type carrier TT.

Figure 2:
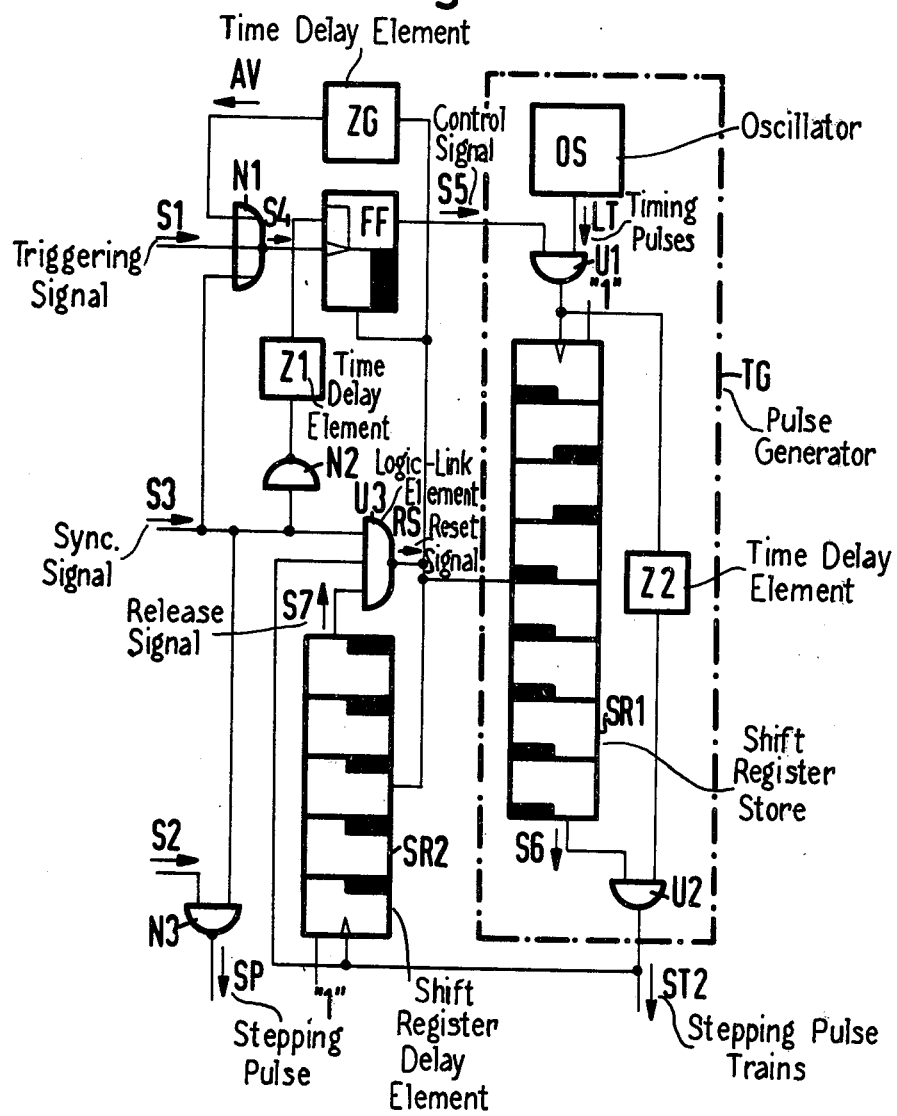
FIG. 2 is a circuit diagram of a switching stage provided in the circuit arrangement.

The switching stage SS illustrated in FIG. 2 contains a flip-flop FF which is set each time a synchronizing process is triggered. At its output, the flip-flop FF feeds a control signal S5 to a pulse generator TG which produces the stepping pulse trains ST2 for the synchronizing of the type carrier TT. The pulse generator TC contains an oscillator OS which produces timing pulses LT assigned to the stepping pulse train ST2. The pulse generator TG also contains a store formed as a shift register SR1 which stores a start program for the acceleration of the stepping motor SM. The switching stage SS also contains a delay element in the form of a further shift register SR2 which prevents the synchronizing signal S3 from being analyzed during the start phase of the stepping motor SM. In order to prevent a new synchronizing process from being triggered due to oscillation of the type carrier TT at the end of the synchronizing process and an associated brief disappearance of the synchronizing signal S3, the switching stage SS also contains a time delay element ZG will known in this art and which produces at its output a signal AV having an on time substantially longer than the signal RS (See FIG. 3) and which temporarily prevents a new setting of the flip-flop FF following each synchronizing process.

Figure 3:
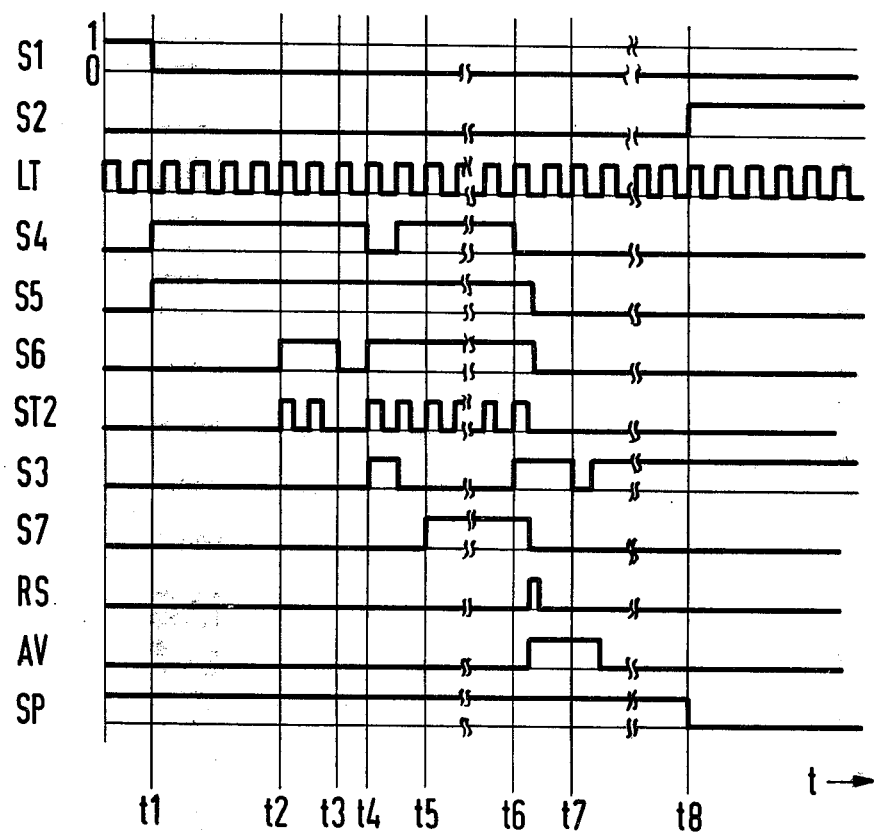
FIG. 3 shows time diagrams of signals at various points of the switching stage.

Further details of the switching stage SS will be described together with the time diagrams, illustrated in FIG. 3, of signals. FIG. 3 shows time diagrams of signals which occur at various points during the operation of the switching stage SS. The time t is plotted in the abscissa direction and the instantaneous values of the signals are represented in the ordinate direction. As all the signals are binary signals, they assume only the binary values designated 0 and 1.

It will first be assumed that the type carrier does not yet occupy the synchronizing position and the synchronizing signal S3 is not present. It will further be assumed that the signal AV is also not present. At the time t1 the triggering signal S1 changes its binary value from 1 to 0, for example, following the connection of the printer or following the recognition of the synchronizing position in the binary counter BC of the printer control unit PC. Thus a signal S4 changes its binary value from 0 to 1 at the output of a NOR gate N1. As it has been assumed that the synchronizing signal S3 is not present, the synchronizing signal S3 having the binary value 1 and which is present at the data input of the flip-flop FF, has been inverted by an inverter N2 and has been delayed by a time delay element Z1 well known in the art for delaying signals. At the time t1 the rising flank of the signal S4 sets the flip-flop FF. At its output, the flip-flop FF feeds the control signal S5 to the pulse generator by which the latter is released. The control signal S5 is fed to a first input of an AND gate U1 at the second input of which the timing pulses LT are present. At its output, the AND gate U1 feeds signals on the one hand to the pulse train input of the shift register SR1 and on the other hand, via a time delay element Z2 well known in this art for delaying signals, to an input of an AND gate U2. Binary values assigned to the start program of the stepping motor SM are stored in the shift register SR1. The start program determines the intervals of time between the stepping pulse trains ST. The shift register SR1 consists, for example, of eight stages. In its rest position, which is governed by a resetting signal RS, it stores the binary values 01100000. The stored binary values are represented by signals S6 at the serial output of the shift register SR1. The signals S6 are fed to the second input of the AND gate U2. The AND gate U2 emits stepping pulse trains ST2 from its output only when the signal S6 has the binary value 1. The delay time of the time delay element Z2 is such that transit times in the shift register SR1 are compensated.

In the rest position, the signal S6 has the binary value 0. Not until the occurrence of the fifth timing pulse LT, after the time t1, does the signal S6 assume the binary value 1 at the time t2 as the contents of the shift register SR1 is displaced by one stage with each timing pulse LT. As a signal having the binary value 1 is present at the serial input of the shift register SR1, the binary value 1 is in each case input into the first stage and displaced by one stage together with the remainder of the contents of the shift register SR1. Following the time t2 the AND gate U2 consecutively emits two timing pulses LT, as stepping pulse trains ST2, to the stepping motor control unit SST. At the time t3, the signal S6 again assumes the binary value 0 and the AND gate U2 emits no stepping pulse train ST2 at this time.

At the time t4 the signal S6 reassumes the binary value 1, and as the originally stored binary values have now been entirely read out from the shift register SR1, the signal S6 retains its binary value 1. Thus the AND gate U2 continues to emit stepping pulse trains ST2.

The stepping pulse trains ST2 are present at the pulse train input of the shift register SR2. This shift register SR2 is likewise brought by the resetting signal RS into its basic position in which the binary value 0 is stored in all stages. A signal having the binary value 1 is likewise present at the serial data input of the shift register SR2. With each stepping pulse train ST2, the contents of the shift register SR2 is displaced by one stage. From its output, the shift register SR2 feeds a release signal S7 to an AND gate U3 which produces the resetting signal RS. The resetting signal RS indicates that the synchronizing process is terminated. In order, however, to prevent the synchronizing process from being broken off during the starting up of the stepping motor SM due to oscillations and a possibly associated short occurrence of the synchronizing signal S3, the synchronizing signal S3 is not analyzed until the release signal S7 has the binary value 1.

At the time t4 it is assumed that the synchronizing signal S3 temporarily occurs as a result of a disturbance. Since, however, the release signal S7 does not assume the binary value 1 until the fifth stepping pulse train ST2 occurs at the time t5, no resetting signal RS is produced. Thus the flip-flop FF remains set and the synchronizing process is not terminated.

After a plurality of stepping pulse trains ST2 following the occurrence of the release signal S7, it is assumed that the synchronizing signal S3 occurs and thus the synchronizing position has been reached. When the stepping pulse train ST2 assumes the binary value 0, the AND gate U3 emits the resetting signal RS which resets the flip-flop FF and resets the shift registers SR1 and SR2 to their basic positions. When the shift register SR2 assumes its basic position, the signal S7 also reassumes the binary value 0, and the resetting signal RS is terminated. The resetting signal RS also triggers the time delay element ZG which produces the signal AV for a given length of time. On the resetting of the flip-flop FF, the control signal S5 assumes the binary value 0 and the pulse generator TC emits no further stepping pulse trains ST2.

At the time t7 it is assumed that, as a result of oscillations of the type carrier TT, the synchronizing signal S3 is temporarily interrupted and assume the binary value 0. Since, however, the signal AV has the binary value 1, the signal S4 retains the binary value 0 and the flip-flop FF is not set again. Shortly after the time t7 the synchronizing signal S3 reassumes the binary value 1 as the type carrier TT occupies the synchronizing position.

At the time t8 it is assumed that it is established in the control unit of the printer that the next position of the type carrier TT which is to be set is equivalent to the synchronizing position. The signal S2 assumes the binary value 1. As, however, the type carrier TT already occupies its synchronizing position, the blocking signal SP at the output of the NAND gate N3 assumes the binary value 0 and prevents the switch-through the stepping pulse trains ST to the stepping motor control unit SST.

The store, designed as a shift register SR1 in the pulse generator TG, contains the start program for the acceleration of the stepping motor SM. The sequence of the stored binary values indicates whether individual timing pulses LT are to be gated out or not. By means of a suitable selection of the binary values it is possible to ensure that the stepping motor SM operates as soon as possible with an approximately constant load angle and thus a clearly defined coordination exists between the stepping pulse trains and the position of the stepping motor SM and the type carrier TT. In this way it is possible to immediately break off the movement of the stepping motor SM and thus of the type carrier TT when the synchronizing position has been reached.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. A circuit arrangement arranged in a control unit for printers for synchronizing a type carrier with a count of a binary counter in a stepping motor control unit which drives a stepping motor by stepping pulses, comprising: '(a) a scanning device means for producing a synchronizing signal when the type carrier assumes a predetermined position;

(b) triggering signal means for producing a triggering signal;

(c) a switching stage having a pulse generator means and being connected to the scanning device means, stepping motor control unit, and triggering signal means;

(d) said pulse generator means having an oscillator means for providing timing pulses, said pulse generator means producing stepping pulse trains by use of said timing pulses following the occurrence of said triggering signal and simultaneous absence of said synchronizing signal; and (e) means for feeding said stepping pulse trains to said stepping motor control unit until said synchronizing signal occurs.

2. A circuit arrangement as claimed in claim 1, characterized in that said switching stage has a flip-flop means connected to be set by said triggering signal when said synchronizing signal is not present and which is connected to be reset following the occurrence of the synchronizing signal, said flip-flop means emitting from its output a control signal connected to release said pulse generator means when said flip-flop means is set.

3. A circuit arrangement as claimed in claim 2, characterized in that the pulse generator means has a store means for storing binary values assigned to a start program for said stepping motor and for reading out said binary values under control of said timing pulses, and that said pulse generator means has an AND gate means for logic-linking read out binary values with said timing pulses and emitting said stepping pulse trains at its output.

4. A circuit arrangement as claimed in claim 3, characterized in that a shift register is provided as said store means.

5. A circuit arrangement as claimed in claim 1, characterized in that a shift register delay element is provided for producing a release signal which does not allow said synchronizing signal to be analyzed until a predetermined number of further stepping pulse trains have been emitted to said stepping motor control unit.

6. A circuit arrangement as claimed in claim 5, characterized in that a logic-linking element means is connected to be fed with said release signal and said synchronizing signal, said logic-linking element means producing a reset signal for terminating the synchronizing of said type carrier.

7. A circuit arrangement as claimed in claim 6, characterized in that a time delay element means is provided which is connected to be supplied with the reset signal and for producing a signal which prevents a setting of said flip-flop means for a predetermined length of time following occurrence of said reset signal.

8. A circuit arrangement for synchronizing a type carrier in a printer with a binary counter in a stepping motor control unit connected to a stepping motor driving the type carrier, comprising (a) scanning and comparator device means for scanning the type carrier, for comparing a count of said binary counter with a result of the scanning, and for producing a synchronizing signal when the type carrier assumes a predetermined position;

(b) triggering signal means for initiating synchronizing of the type carrier with the binary counter;

(c) pulse generator means connected to the scanning and comparator device means, to the stepping motor control unit, and to the triggering signal means, said pulse generator means generating stepping pulse trains for synchronization of said stepping motor and type carrier following the occurrence of said triggering signal and simultaneous absence of said synchronizing signal; and (d) means for feeding said stepping pulse trains to said stepping motor control unit until said synchronizing signal occurs.

* * * * *